UNITED STATES PATENT OFFICE.

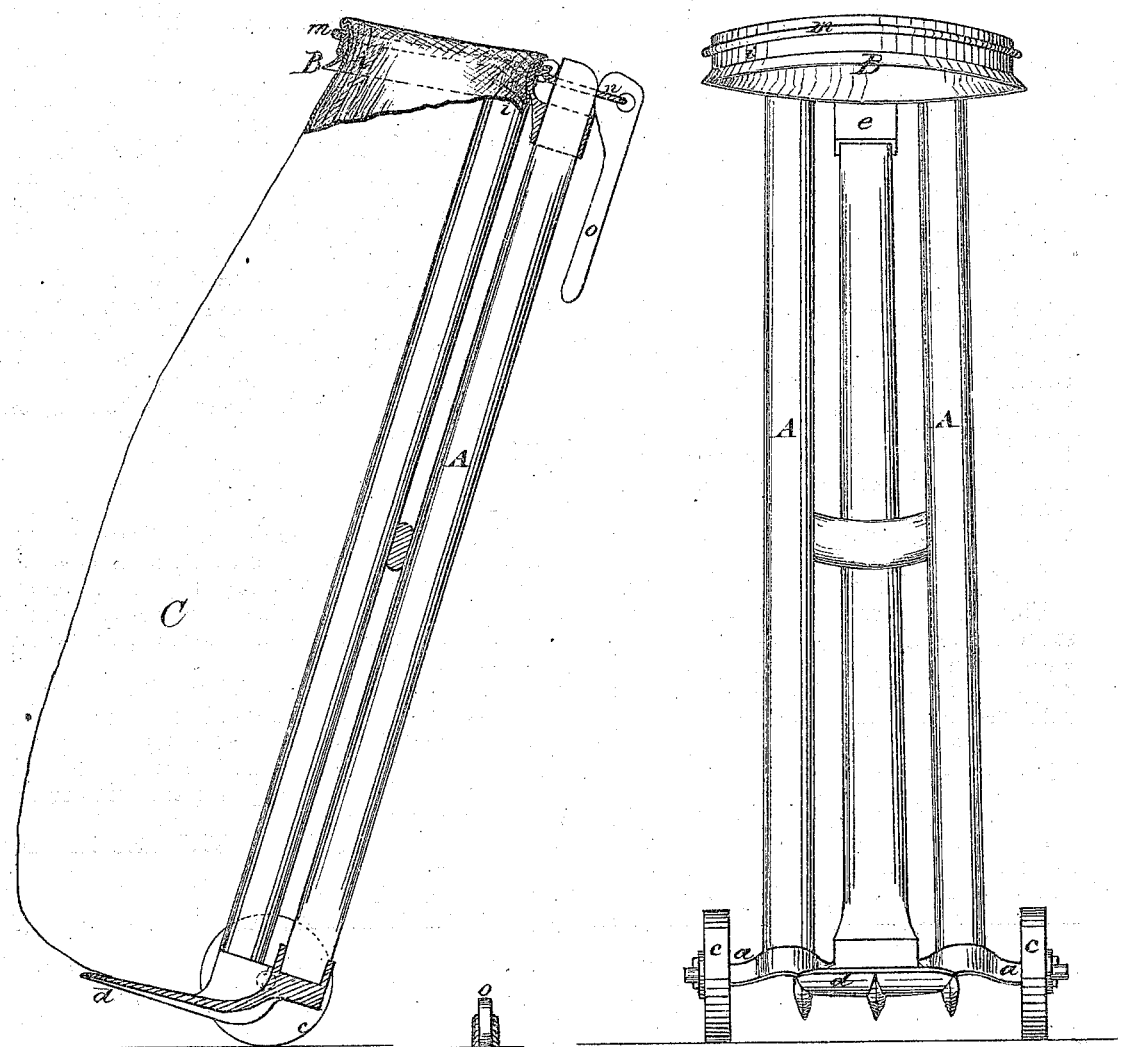
P. C. VAN BROCKLIN.
Bag Holder & Truck.
No. 122,685. Patented Jan. 9, 1872.
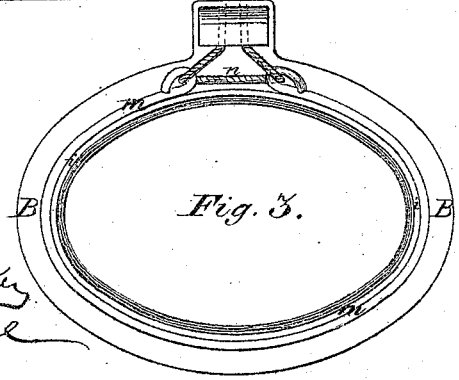

PHILIP C. VAN BROCKLIN, OF PARIS, CANADA.

IMPROVEMENT IN COMBINED BAG-HOLDERS AND TRUCKS.

Specification forming part of Letters Patent No. 122,685, dated January 9, 1872.

SPECIFICATION.

I, PHILIP C. VAN BROCKLIN, of Paris, in the Province of Ontario, Dominion of Canada, have invented certain Improvements in Bag-Holders and Trucks, of which the following is a specification:

Nature and Objects of the Invention.

My invention relates to an improvement in bag-holders to be attached to trucks, constructed in such a manner that bags or grain-sacks may be instantly attached to or detached from the machine without any injury whatever to the bags; and after they have been filled can, without change of position or extra labor, be carted away to any desired place of deposit; the object of my improvement being to save both time and labor.

Description of the Accompanying Drawing.

Figure 1 represents a side view of the truck standing nearly upright, partly in sections, with the bag and bag-holder attached. Fig. 2 represents a front view of an upright truck with the bag-holder attached. Fig. 3 represents a plan view of the bag-holder embodying my invention.

General Description.

A represents the frame of the truck, with axles $a\ a$ and wheels $c\ c$ attached to the lower end, and shovel $d$ in front. The bag-holder B is attached to the upper end of the truck by means of the shank $e$ and two holes in the elliptical flanged collar $i$, into which the three bars of the truck are fastened, respectively; and consists of the elliptical flanged collar or ring $i$, over the neck of which passes a wire ring, $m$, fastened and tightened by means of the cord $n$ and the cam or eccentric lever $o$. C represents the bag, the upper end of which is passed through the elliptical flanged collar $i$ on the inside, and turned over its neck, over which is then placed the wire ring $m$, the two ends of which are contracted by pressing down the cam or eccentric lever $o$, which tightens the cord $n$.

Claims.

I claim as my invention—

1. The combination of the elliptical flanged collar or ring $i$ with its shank $e$ attached with the wire ring $m$, the cord $n$, and the cam or eccentric lever $o$, when constructed and arranged in the manner and for the purpose hereinbefore set forth.

2. The combination of the bag-holder B, constructed and arranged in the manner hereinbefore set forth, with the truck A and its axles $a\ a$, wheels $b\ b$, and shovel $d$ in front, constructed and arranged in the manner hereinbefore set forth.

PHILIP C. VAN BROCKLIN.

Attest:
Y. WATRUS,
A. R. FAULKNER.